Sept. 5, 1967

T. CELIO ETAL

CATHODE RAY PHOTOGRAPHIC PRINTER
HAVING POSITIVE FEEDBACK
Filed Aug. 22, 1963

3,340,360

INVENTORS
Tino Celio and
Hansjuerg Mey

Pierce, Scheffler & Parker
Attorneys

United States Patent Office 3,340,360
Patented Sept. 5, 1967

3,340,360

CATHODE RAY PHOTOGRAPHIC PRINTER HAVING POSITIVE FEEDBACK

Tino Celio, Buchs, and Hansjuerg Mey, Oberengstringen, Switzerland, assignors to Gretag Aktiengesellschaft, Regensdorf, Switzerland Filed Aug. 22, 1963, Ser. No. 303,801
Claims priority, application Switzerland, Aug. 23, 1962, 10,097/62
7 Claims. (Cl. 178—6.8)

ABSTRACT OF THE DISCLOSURE

A method of reproduction of an original picture which utilizes point by point scanning of the original from a light source which is a cathode ray tube. The light source which serves simultaneously to illuminate and reproduce the original is passed along an optical path through the original in a point by point manner and reaches a photosensitive layer, e.g. paper on which the reproduction is made. A photoelectrical light measuring means senses in a point by point manner the light intensity after passing through the original and prior to reaching the reproduction layer and the output from the photoelectrical light measuring means is connected to the input side of an amplifier. The output side of the amplifier is connected to the grid of the cathode ray tube so as to establish a positive feed-back loop and the gain of the loop is modified according to a specific time law to provide a total gain of at least +1 to be reached at predetermined transmission values of the original.

Figure 1:
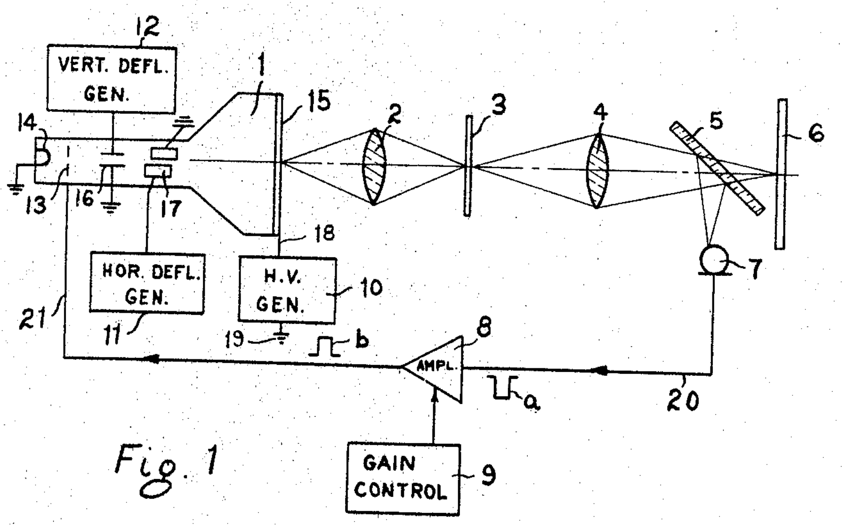

This invention relates to a method of point by point scanning and reproduction of an original picture.

Scanning methods have already been proposed in photographic art, whereby the picture contrast can be modified by electronically produced masks. Such methods use a punctiform light source which scans the picture in accordance with a specific raster, a photosensitive element—for instance, a photoelectric cell—which measures the scanning light modulated by the original, and a feed-back network whereby the light source is controlled in dependence upon the photosensitive element and in accordance with a specific law, thus causing the aforesaid masks to be produced. The light spot of a cathode ray tube is customarily used as light source, and serves simultaneously as a reading and writing element. The feedback network is usually poled in such a way that negative feed-back results. The light source therefore becomes brighter in the case of greater density of the original picture, and vice versa. A negative image of the original, in optical coincidence with the latter, is thus produced on the cathode ray tube. By superimposition of this so-called mask image, the contrast of the original is attenuated. By virtue of this capacity to modify the contrast of the original, this method is suitable for photographic printing. The said attenuation of contrast corresponds toa flattening of the contrast of the print paper. Owing to the image reversal of the mask image, the method can also be used for picture reproduction for example, to visualize a negative original.

However, such a scanning method possesses various disadvantages which are due to the use of a feed-back loop, since mask images with strongly distorted highlights are usually produced. Brightness distortions can certainly be avoided by using an infinitely large loop gain, but in this case variable reduction of the contrast is no longer possible.

It has also been previously proposed to adopt a positive feed-back instead of a negative one. This produces, by analogous means, a positive image of the original on the cathode ray tube, which by superimposition accentuates the contrast of the original i.e., it corresponds to an increase of contrast of the print paper. According to this proposed method, the total gain of the loop for all picture elements is made smaller than one, since otherwise the loop becomes unstable. This makes it necesary to accept strong brightness distortions in the mask image.

The present invention seeks to avoid these disadvantages. According to the present invention there is provided a method of scanning and reproducing an original, wherein an original is scanned point by point by a light ray, the scanning light serving simultaneously to illuminate and reproduce the original, and the intensity of the light ray being controlled in dependence upon the light passing through the original by means of a feed-back loop which is poled in the sense of positive feed-back, and wherein the total gain resulting from the gain of the feed-back loop and the transmission of the original is at least partly greater than +1.

Figure 2:
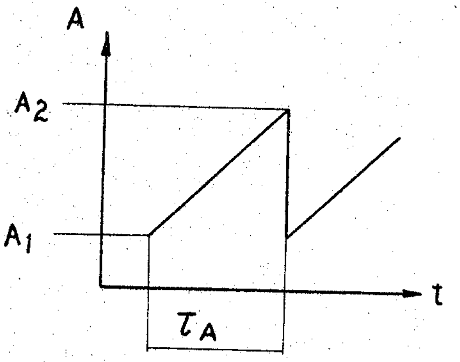

In order to enable the invention to be more readily understood, reference will now be made to the accompanying drawings, which illustrate diagrammatically and by way of example an embodiment thereof, and in which:

FIG. 1 is a block circuit diagram of apparatus for performing the present method, and FIG. 2 shows the variation in time of the gain in a feed-back circuit of the apparatus.

Referring now to FIG. 1, the apparatus there shown includes a cathode ray tube 1 having a cathode 14, a control grid 13, horizontal deflection plates 17, vertical deflection plates 16 and a screen 15. The deflection plates 17 are fed from a horizontal deflection generator 11, and the deflection plates 16 from a vertical deflection generator 12. These generators generate a raster of constant brightness on a screen e.g., as in television. A high tension source 10 is also connected between the screen 15 and earth 19 via a conductor 18. A light-transmitting object 3 e.g., a negative is illuminated by the light ray from the cathode ray tube by means of a lens 2. The light ray, the brightness of which is modulated in dependence upon the transparency of the picture point or element scanned at any time, illuminates, through an optical system 4, a photosensitive layer 6, e.g. a photosensitive photographic paper. A ray divider 5 directs a part of the light onto a photosensitive measuring device 7—e.g., a photomultiplier—which controls an amplifier 8 via an electrical connection 20. The output voltage of the amplifier 8 is applied, via a conductor 21, to the grid 13 of the cathode ray tube 1.

An appliance 9 serves to control the gain of the amplifier 8 in a manner which will hereinafter be described. The amplifier 8 is poled in such a way that a negative pulse (*a*) at the input appears as a positive pulse (*b*) at the output.

Positive feed-back therefore exists in the loop of FIG. 1. Therefore, when the original 3 becomes denser, the picture tube is controlled darker. As a result, the original appears even denser at the photoelectric cell, the picture tube becomes still darker, until the picture tube becomes completely dark. The same reasoning applies to the case where the original 3 becomes brighter, when the picture tube 1 is accordingly driven up to the greatest possible brightness i.e., to the saturation limit. The apparatus therefore exhibits bi-stable behaviour, only totally bright (white) or totally dark (black) points being possible on the picture tube. Which points will be white and which will be black, can be shown by a simple consideration. If A is the electrical gain of the amplifier 8, $\beta_0$ the electro-optical gain of the amplifier output picture tube original photoelectric cell amplifier input association in the case of a totally transparent original, and T the transparency of the original, then all points are white for which the condition:

$$A\beta_0 T \geqq 1$$

is true. If for example, $A=20$ and $\beta_0=0.5$, then on the picture tube, all points will appear white whereof the transparency T in the original is $\geqq 1/10$ i.e., all points in the original whereof the density D is less than 1.

The explanation of the bi-stable behaviour of the arrangement slightly simplifies the actual conditions, since for picture elements of the original for which $A\beta_0 T$ is smaller than 1, a positive mask image is theoretically produced. However, the contrast of such points is so weak, and their brightness with reference to white points is so small, that they are totally invisible in the practical case.

The arrangement therefore exhibits virtually pure digital behaviour, and therefore permits only a two-tone reproduction with A and/or $\beta_0$ as tone separation parameters. The method is consequently suitable for density selection for example in microscopy for enumerating particles of specific density. It is also possible to conceive densitometers, more particularly equidensitometers, or measuring instruments for photoelastic purposes, operating by this method.

According to a further development of the invention, the gain of the feed-back loop is varied in time for example, by modifying the electrical gain factor A, the variation in time advantageously obeying a periodic law. FIG. 2 shows a possibility of the time variation of the gain in the feed-back circuit, where *t* connotes the time, A the electrical gain factor and $\tau_A$ the cycle period. With regard to the cycle period, two important cases in particular are conceivable:

(1) The cycle period $\tau_A$ of the variation of A is large in comparison with the scanning period of a total picture. The light×time integral is formed gradually over a plurality of picture scans. At the first picture scan, the brightest picture elements of the original will appear white on the picture tube. At the next picture scan, further darker picture elements of the original brighten up, until finally the total picture appears white on the picture tube. The mask image is recorded, as it were, in layers, similarly to a topographical relief.

(2) The cycle period $\tau_A$ of the variation of A is equal to the scanning period of a picture element. The light×time integral is then formed point by point, by modification of the lighting period of the picture element. The process occurs in principle as under (1), but within picture element time. At the beginning of each picture element, the gain is $A_1$, and it increases to $A_2$ at the end of the picture element. If the picture element of the original is white, or grey, or black, then the corresponding mask image element lights up during the total time, or a part, or no part of the picture element period. The image is therefore recorded in a single picture scan, namely point by point with points of variable length, similarly to the customary procedure in printing art.

Further possibilities are of course conceivable. For example, the cycle period may also be shorter than the scan period of a picture element.

It is therefore possible, according to this further development, to produce from the initially purely digital behaviour which permitted only a two-tone reproduction, pictures exhibiting continuous brightness variations. This significantly extends the aforesaid field of application of the present method. For instance, the method is suitable for photographic recording and reproduction, for copying (printing) and enlarging, particularly for radiographic and photogrammetric purposes. Apparatus operating by the present method may further be used with advantage as a scanning and reproducing appliance in the domain of electronic colour correction and in television art.

What is claimed is:

1. A method for reproducing an original, comprising the steps of scanning the original point by point by means of a light ray which serves simultaneously to illuminate and reproduce the original, controlling the intensity of the light ray in dependence upon the light passing through the original by means of a positive feed-back loop having a photoelectrical light measuring means and an amplifier, the total gain of said feed-back loop resulting from the gain of the amplifier, the light producing and associated optical means, the photoelectrical light measuring means, and the transmission of the original, modifying said total gain according to a specific time law extending over a predetermined number of picture scans, said time law providing for the +1 value of the total gain to be reached in each scan at a different transmission value of the original.

2. The method as claimed in claim 1, in which said total gain is constant over each single picture scan but has a different value for different picture scans.

3. The method as claimed in claim 1, in which the modification of said total gain is effected by modifying the gain of the amplifier.

4. A method for reproducing an original, comprising the steps of scanning the original point by point by means of a light ray which serves simultaneously to illuminate and reproduce the original, controlling the intensity of the light ray in dependence upon the light passing through the original by means of a positive feed-back loop having a photoelectrical light measuring means and an amplifier, the total gain of said feed-back loop resulting from the gain of the amplifier, the light producing and associated optical means, the photoelectrical light measuring means, and the transmission of the original, modifying said total gain according to a specific cyclic time law having a cycle period not longer than the scanning period of a picture element, wherein at least for part of the picture elements said total gain reaches at least +1, whereby the lighting length of each picture element is determined as a function of its transmission value.

5. The method as claimed in claim 4, in which the modification of the total gain is effected by modifying the gain of the amplifier.

6. A method for producing from an original a two-tone reproduction comprising the steps of scanning the original point by point by means of a light ray which serves simultaneously to illuminate and reproduce the original, controlling the intensity of the light ray in dependence upon the light passing through the original by means of a positive feed-back loop having a photoelectrical light measuring means and an amplifier, the total gain of said feed-back loop resulting from the gain of the amplifier, the light producing and associated optical means, the photoelectrical light measuring means, and the transmission of the original, adjusting said total gain so that it reaches at least +1 for a predetermined transmission value in the transmission range of the original, whereby the light ray reaches its highest intensity (white) for the areas of the original having transmission values which are equal to or greater than said predetermined transmission value and reaches its lowest intensity (black) for the areas having transmission values which are below said predetermined transmission value, the adjusted total gain being significant for the transmission value of the original at the borders between white and black.

7. The method as claimed in claim 6, in which the adjustment of the total gain is effected by adjusting the gain of the amplifier which has been standardized according to transmission units.

References Cited

UNITED STATES PATENTS

| | | | |
|---|---|---|---|
| 2,989,909 | 6/1961 | Reed | 95—73 |
| 3,006,238 | 10/1961 | Eberline | 178—6.7 |
| 3,183,766 | 5/1965 | Takasaka | 178—6.7 |

JOHN W. CALDWELL, *Acting Primary Examiner.*

DAVID G. REDINBAUGH, *Examiner.*

H. W. BRITTON, *Assistant Examiner.*